Patented Oct. 12, 1926.

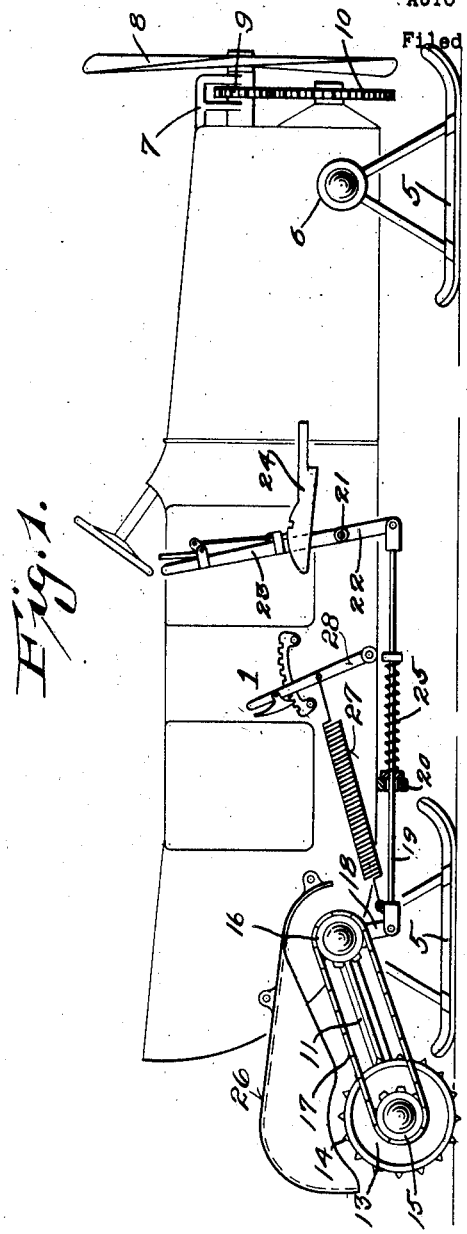

1,602,924

UNITED STATES PATENT OFFICE.

MICHAEL MOLITOR, OF NEW HOLSTEIN, WISCONSIN.

AUTO SLED PROPELLER.

Application filed April 14, 1920. Serial No. 373,682.

My invention relates to motor-driven sleds, particularly to that type which employs an aerial propeller as its driving means.

The object of the invention is to provide a sled of this type which can be easily controlled.

A further object of the invention is to provide a sled which is driven by an aerial propeller arranged at its front end and connected to the drive shaft of the motor, and having at its rear end means driven from the motor and adapted to be brought into engagement with the ground to assist in the starting, stopping, backing and steering of the sled.

Heretofore, great difficulty has been experienced in controlling a sled of this character, due to the fact that when the front runners are turned in the desired direction the rear of the sled suddenly skids until it is in alinement with the front runners. Furthermore, the backing of a sled of this character has been impossible, but it is my aim to overcome these difficulties by providing at the rear of the sled positive means which will assist in the control of the sled.

In the drawing:—

Figure 1 is a side elevation of the propelling and controlling means arranged upon a sled body, Figure 2 is a top plan view of the same.

Referring to the drawings, 1 designates the body of the sled, which may be of any suitable construction, preferably similar to that of an automobile, and having arranged therein at its forward portion, a gasolene engine or other motor from which extends the usual propelling shaft 2, the other end of which is connected to the differential axle 3.

The front axle 4 of the vehicle is of the usual type, and has suitable steering means arranged thereon.

Mounted upon the end portions of the front axle are runners 5, which are made of metal, and from which rise standards equipped in their upper ends with suitable bearings 6 adapted to receive the ends of the axle. The runners on the rear axle 3 are of similar construction, with the exception that the bearings 6 are constructed so that the axle can rotate freely therein.

The front end of the vehicle has arranged thereon a suitable bearing 7 in which is rotatably mounted a stub shaft carrying at its outer end the aerial propeller 8 and at its intermediate portion a small gear 9, which meshes with a large gear 10 keyed to the end of the crank shaft of the motor.

Secured to the rear axle 3 and on each side of the differential housing are suitable bearings adapted to have rotatably mounted thereon hanger arms 11 which extend downwardly and rearwardly. The free ends of these arms are equipped with suitable bearings in which a shaft 12 is rotatably mounted. Secured to the shaft 12, and adjacent its end portion, are wheels 13 carrying on their peripheries ground engaging studs 14. The shaft 12 has at its end portions sprocket wheels 15 which are keyed thereto, and being operatively connected by the sprocket chain 17 to sprocket wheels 16 secured at the ends of the rear axle 3.

The arms 11 have at their axle-engaging ends, arms 18 which extend at right angles thereto, the free ends of which are connected to rods 19 which extend longitudinally of the vehicle frame, and through suitable guide members 20 arranged thereon. The rods 19 have connected at their free ends the links 22 which are pivotally mounted upon a transverse rod 21 secured to the sides of the frame. Mounted upon the rod 21 is a hand lever 23 which may be adjusted transversely of the rod 21 to suit the convenience of the operator.

The lever 23 is provided with the usual locking pawl adapted to engage the rack 24 secured in any suitable plan upon the frame. In the drawings, I have shown this connected to the transmission casing.

The rods 19 have encircling them coiled springs 25 which bear upon stops carried by the rods and the guide members 20 carried by the frame of the vehicle. By this construction, it will be seen that when the lever is released the springs force the rods forward and thus causing the spur wheels 13 to engage the ground.

When it is desired to start the vehicle, the engine is started slowly, and as the speed of the engine is not sufficient to cause the propeller to move the vehicle, the hand lever 23 is released, thus causing the spur wheels to engage the ground and move the vehicle. When the speed of the motor has increased sufficiently to cause the propeller to move the vehicle, the spur wheels are drawn up and the vehicle moves under power of the propeller alone. When it is desired to stop the vehicle the spur wheels are lowered and their engagement with the ground acts as a brake as the speed of the motor is slowly decreased. Also, it is apparent that the spur wheels may be used when it is desired to back the vehicle, or to assist in the steering thereof. When it is desired to cause the spur wheels to function in the last-named use, they are lowered so as to prevent the sled from being under the direct pull of the propeller, thus eliminating the skidding of the rear part of the vehicle, tending to retard the speed of the sled.

It will be observed from the drawings, that the aerial propeller is driven faster than the spur wheels, due to its connection with the crank shaft, and at any time when the spur wheels are brought into engagement with the ground the speed of the sled is retarded to a certain degree.

I have disclosed my invention in the best form known to me at present, but as the several parts of the device are subject to change, by the employment of ordinary mechanical skill, I limit myself to the use and development of my invention only by the terms of the appended claim.

As shown in Figure 1 the wheel 13 and associated mechanism is adapted to be nested within a housing 26, when said wheel is resting in its inoperative position, the housing being suitably secured to the frame of the vehicle.

In order to provide an adjustable tension device for holding the wheel 13 to its work, I may provide a coil spring 27 which as shown is connected to the arm 18 and lever and detent mechanism 28 at its opposite end whereby said spring may be regulated. Obviously when the vehicle is not used upon snow or ice, wheels may be substituted for the runners 5.

Having thus fully described my invention, what I claim as new, and desire to secure by Letters Patent, is:—

A motor driven sled comprising a body having front and rear axles, runners connected to each, a movable shaft arranged parallel to said rear axle and rotated by chain connections with the extremities of the axle, ground engaging elements carried by said shaft, said shaft being pivotally connected to the rear axle by means of arms having bearings adapted to encircle said axle, a depending arm formed integral with each of said bearings, rods connecting said arm with a hand lever, and resilient means for holding said ground engaging elements to the ground connected to said body and each of said rods.

In testimony that I claim the foregoing I have hereunto set my hand at Milwaukee, in the county of Milwaukee and State of Wisconsin.

MICHAEL MOLITOR.